United States Patent
Mutterer, Jr. et al.

(10) Patent No.: US 6,258,329 B1
(45) Date of Patent: *Jul. 10, 2001

(54) MICROWAVE TRANSPARENT VESSEL FOR MICROWAVE ASSISTED CHEMICAL PROCESSES

(75) Inventors: James Nelson Mutterer, Jr., Indian Trail; Wyatt Price Hargett, Jr., Matthews, both of NC (US)

(73) Assignee: CEM Corporation, Matthews, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,979

(22) Filed: Apr. 20, 1998

(51) Int. Cl.[7] ................................................. B01J 19/08
(52) U.S. Cl. ............... 422/186.29; 422/186; 422/186.04; 422/21; 204/157.15; 204/157.43; 219/686; 219/687; 219/756
(58) Field of Search ............................. 422/21, 101, 186, 422/186.04, 186.29, 906, 102, 99; 219/686, 687, 756; 204/157.15, 157.43

(56) References Cited

U.S. PATENT DOCUMENTS

| | | | |
|---|---|---|---|
| 3,098,718 | * 7/1963 | Ferrari | 422/99 |
| 3,926,556 | 12/1975 | Boucher . | |
| 4,933,529 | 6/1990 | Saville . | |
| 5,304,766 | 4/1994 | Baudet et al. . | |
| 5,451,302 | 9/1995 | Cha . | |
| 5,796,080 | 8/1998 | Jennings et al. . | |

FOREIGN PATENT DOCUMENTS

| | | |
|---|---|---|
| 4401601 | 7/1995 | (DE) . |
| 0628330 | 12/1994 | (EP) . |
| 93/22650 | 11/1993 | (WO) . |
| 95/11750 | * 5/1995 | (WO) . |

OTHER PUBLICATIONS

Elke M. L. Lorentzen et al., "Comparison of Microwave–Assisted and Conventional Leaching USing EPA Method 3050B," Anal. Chem., vol. 68, No. 24, Dec. 15, 1996, pp. 4316–4320.

* cited by examiner

*Primary Examiner*—Hien Tran
(74) *Attorney, Agent, or Firm*—Summa & Allan, P.A.

(57) ABSTRACT

A system for carrying out microwave assisted chemical reactions is disclosed. The system includes a source of microwave radiation; a cavity in communication with the source, an attenuator in communication with the cavity for providing access to the cavity while preventing microwaves from escaping through the attenuator, and a vessel positioned in the cavity and the attenuator and extending externally of the attenuator for holding materials in the cavity while microwaves from the source are applied thereto. The vessel includes a reaction chamber and a venting portion. The chamber portion is positioned entirely within the cavity, and the venting portion extends from the cavity and through the attenuator and externally of the attenuator and has a gas passage for permitting gases to flow to or from the reaction portion from gas sources external to the cavity, the attenuator, and the vessel.

21 Claims, 5 Drawing Sheets

MICROWAVE TRANSPARENT VESSEL FOR MICROWAVE ASSISTED CHEMICAL PROCESSES

FIELD OF THE INVENTION

The present invention related to vessels for carrying out chemical reactions and in particular relates to open reaction vessels and microwave assisted chemical processes.

BACKGROUND OF THE INVENTION

The present invention relates to microwave assisted chemical processes and the equipment used to carry them out. Microwaves can heat various materials, including chemical reactants, by interacting directly with the materials to cause molecular motion and generate heat. As a result, the effect of microwaves on certain materials, including water and a number of organic liquids and related materials, is very rapid compared to more conventional heating techniques. This rapid reaction between microwaves and such materials offers particular advantages in heating certain reactions which otherwise would have to be heated by conduction or convection processes. Because convection and conduction transfer heat between adjacent objects (for example, a beaker on a hot plate), they can be relatively slow and thus disadvantageous in certain circumstances.

In particular, where ongoing processes such as commercial manufacturing requires chemical testing and analysis that in turn may require heating steps, the lag time required by conventional heating techniques can result in a similar lag time in the production process itself. Thus, to the extent that these tests (or sample preparation for such tests) can be done more quickly, the resulting processes can be carried out more quickly as well. Accordingly, the use of microwave techniques has greatly increased the speed and frequency at which certain types of chemical analysis can take place.

Accordingly, microwave assisted techniques have been developed for drying, moisture analysis, digestion, extraction, and other related techniques.

There are a number of ways to carry out microwave assisted chemical reactions. In some techniques, the reaction is most advantageously carried out in a sealed, pressure-resistant vessel in which the reaction can proceed under conditions of both elevated temperature and elevated pressure. In other circumstances, microwave assisted chemical reactions are carried out under "open" conditions; i.e., at ambient pressure. Some of these open systems use reaction vessels that resemble (as a somewhat simplistic description) test tubes; i.e., cylindrical vessels with one closed end and one open end. It will be understood that as used herein, "open" refers to systems that are in general equilibrium with the ambient atmosphere. Thus, an "open" vessel can actually have a lid, but it will also have some sort of a vent that allows it to come to equilibrium with ambient pressure.

The test tube shape of such vessels is often helpful in certain techniques in which the lower end of the vessel is supported in a cavity into which microwaves are sent from their source, typically a magnetron, and through a waveguide to the cavity. The vessel extends into the cavity through a microwave attenuating device that is commonly referred to a "choke." A choke is a structural feature, sometimes as simple as a short piece of tubing that, although otherwise open to its surroundings, will block the passage of microwaves therefrom. Accordingly, in a typical vertical arrangement, a reaction vessel will be maintained vertically with its lower portion holding a sample in the microwave cavity, and with its upper portions supported by the choke, and with some vent or other opening at the top to allow it to come to equilibrium with the surrounding atmosphere.

A number of commercially available microwave devices use such a vertical orientation of open vessels, the most recent of which is the STAR system available from CEM Corporation of Matthews, N.C. and which is thoroughly described in commonly assigned application Ser. No. 08/538,745, filed Oct. 3, 1995, and now U.S. Pat. No. 5,796,080. The disclosure of the '745 patent application is incorporated entirely herein by reference.

The vertical orientation of such vessels, however, has led to a somewhat unexpected problem in some circumstances; mainly, liquids that are heated in the lower portions of the vessel, and then evaporate must travel upwardly through and out of the remainder of the vessel. Because only a portion of the vessel is typically maintained in the cavity, however, these vapors can tend to cool while they are within the upper portions of the vessel, and in some circumstances condense on the inside walls of the vessel. When such occurs, the condensate returns by the action of gravity to the remainder of the liquid sample; i.e., an unintentional refluxing.

In many circumstances such unintentional refluxing makes little or no difference in the overall chemical process being carried out. There are other processes, however, for which microwave-assisted heating is quite desirable but for which the refluxing effect is disadvantageous. For example, microwave assisted chemistry is now being used as one of the sample preparation steps in acid purity testing for the semiconductor industry. As those familiar with that industry are aware, the materials used in certain steps must be of extremely high purity; i.e., with impurity levels at the part per trillion level or less. In order to test the purity of the acid, while avoiding the harsh effects of concentrated acid on the testing equipment, a larger sample of acid (e.g., 50 milliliters) is typically evaporated to a much smaller volume (e.g., 1–2 ml) then diluted with highly purified water and analyzed. In testing the resulting diluted sample, the presence of acid can be quite disadvantageous because it changes the viscosity of the solution which in turn effects certain steps in the test, particularly certain aerosol techniques.

It has been found, however, that when using microwave assisted techniques in open vessels of the type described, the refluxing effect can be significant as the vapors from the acid being evaporated recondense near the top of the vessel and run back down to the sample portion.

This is, of course, just one example of the potential disadvantages of the refluxing effect in such vertically oriented open vessels. It nevertheless illustrates the need for reaction vessels for open microwave assisted chemical processes that either minimize or eliminate the refluxing problem in these vessels.

OBJECTION AND SUMMARY OF THE INVENTION

Therefore, it is an object of the invention to provide a microwave system and vessel that can be used in open reaction systems while avoiding the disadvantages of unintended recondensation of vapors from the reaction.

The invention meets this object with a system for carrying out microwave assisted chemical reactions that comprises a source of microwave radiation, a cavity in communication with the source, and an attenuator in communication with the cavity for providing access to the cavity while preventing microwaves from escaping through the attenuator and a vessel positioned in the cavity and the attenuator and extending externally of the attenuator for holding materials in the cavity while microwaves from the source are applied to those materials. The vessel further comprises a reaction chamber and a venting portion. The chamber portion is positioned entirely within the cavity and forms the volumetric portion of the vessel and the venting portion extends from the cavity and through the attenuator and externally of the attenuator and has a gas passage for permitting gases to flow to or from the reaction portion from gas sources external of the cavity, the attenuator, and the vessel.

The foregoing and other objects and advantages of the invention and the manner in which the same are accomplished will become clearer based on the followed detailed description taken in conjunction with the accompanying drawings in which:

DETAILED DESCRIPTION OF THE PREFERRED EMBODIMENTS

The present invention is a system for carrying out microwave assisted chemical reactions and that particularly incorporates a reaction vessel with particular advantages that complement the system.

Figure 1:
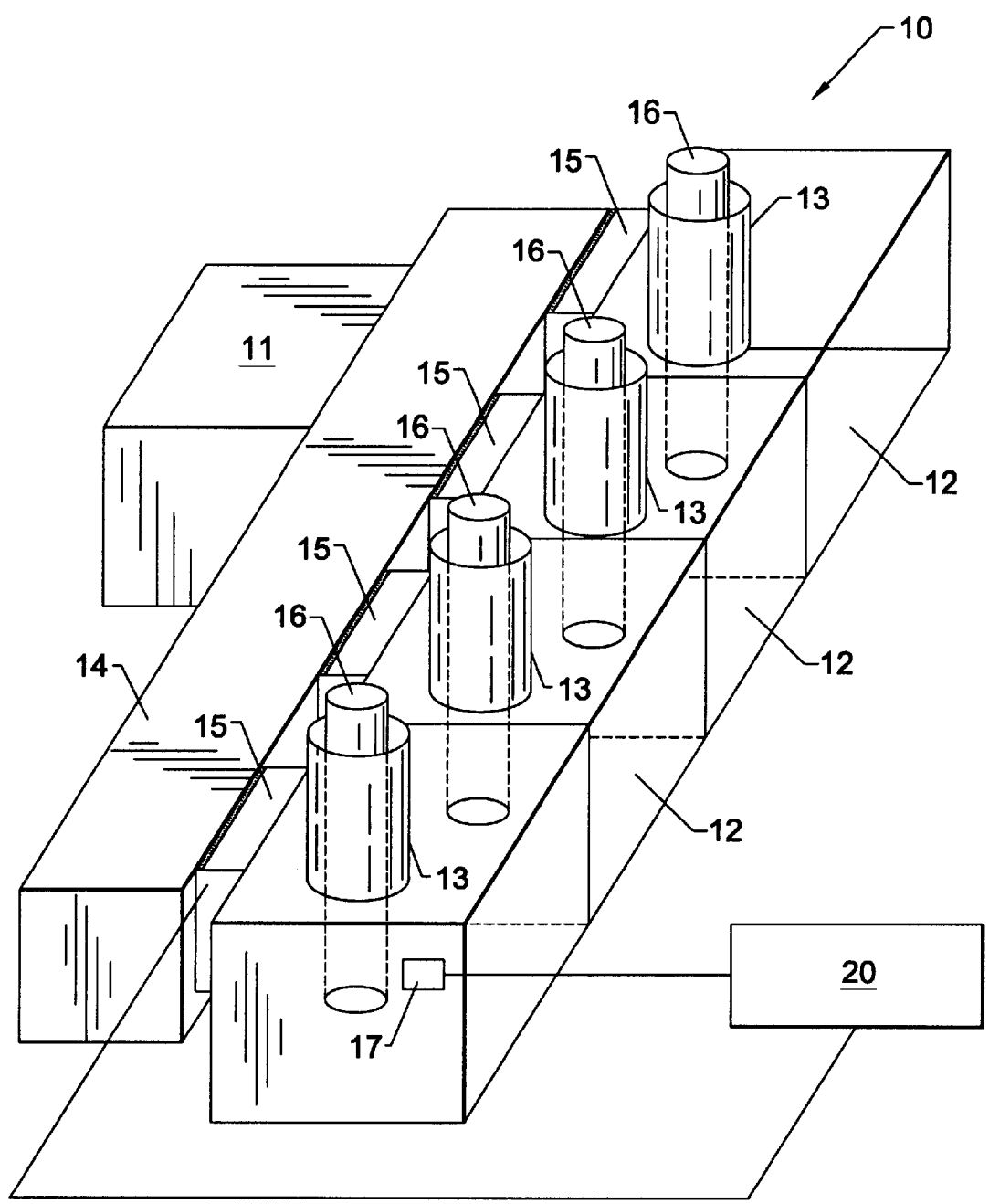
FIG. 1 is a schematic perspective diagram of a microwave assisted chemistry system according to the present invention.

A system according to the present invention is illustrated in FIG. 1 and broadly designated at 10. The system includes a source of microwave radiation 11 which in preferred embodiments comprises a magnetron because of its present attractive combination of size, weight, and cost. Those familiar with the generation of microwaves will recognize, however, that other devices can be used to produce microwaves such as klystrons and solid state devices, and that these can be equivalently substituted for the magnetron 11 without departing from the scope of the invention or the claims.

A cavity is in communication (i.e., microwave transmissive communication) with the source 11. FIG. 1 illustrates an embodiment that includes a plurality of cavities, each designated at 12.

A respective attenuator 13 is in communication with each cavity 12 for providing access to the cavity while preventing microwaves from escaping through the attenuator. The use of attenuators in limiting the passage of microwaves is well understood by those familiar with the propagation and control of microwaves. In particular, it will be understood that the length and diameter of the attenuator 13 will be selected based upon the expected or controlled wavelength of the microwaves produced by the source and reaching the cavity 12. Thus, an appropriate attenuator can be selected by those of ordinary skill in this art without undue experimentation. As an example, however, for the 2450 megahertz (MHz) frequency of microwaves typically in chemistry devices, with an associated wavelength of 4.8 inches, a choke that is approximately 2.1 inches in diameter and 4.8 inches in length is sufficient. The cavities 12 and the attenuators 13 are formed of materials that reflect rather than transmit microwaves, and are most typically formed of structural metals.

FIG. 1 schematically illustrates a system in which all of the cavities 12 are in communication with a single microwave source 11 through a common waveguide 14. This is the arrangement described and illustrated in detail in the aforementioned U.S. Pat. No. 5,796,080, which as noted above is incorporated entirely herein by reference. As in that system, the present system 10 comprises individually adjustable microwave moderating means 15 between each of the cavities and the source 11 for adjusting the microwave radiation that reaches each of the cavities 12 from the source 11.

A vessel 16 is positioned in each cavity 12 and in each attenuator 13 and extends externally of the attenuator for holding materials in the cavity 12 while microwaves from the source 11 are applied to the cavity, the vessel, and the vessel's contents. The vessel 16 will be described in more detail in conjunction with FIGS. 2–7. As a brief description, however, each of the vessels 16 comprises a reaction chamber and a venting portion. The reaction chamber portion is positioned entirely within the cavity 12 and forms the volumetric portion of the vessel and the venting portion extends from the cavity and through the attenuator and externally of the attenuator and has a gas passage (best illustrated in FIGS. 3–5) for permitting gases to flow to or from the reaction portion of the vessel from gas sources external of the cavity 12 of the attenuator 13 and the vessel 16.

FIG. 1 also illustrates that a sensor 17 is associated with each of the vessels 16 for monitoring the conditions of the vessel 16 and the reaction therein. Only one sensor 17 is illustrated in FIG. 1 for the sake of clarity. The sensor 17 can be selected to monitor any desired measurable characteristic of the reaction in the vessel 16 or where appropriate of the vessel 16 itself. The sensor 17 is typically selected from the group consisting of temperature sensors (including thermocouples and optical temperature sensing devices, pressure sensors, photodetectors (for both visible and invisible portions of the spectrum), and electrochemical detectors such as pH meters).

In preferred embodiments, a control system 20 is operatively associated with both the sensor 17 and the moderating means 15 and controls and adjusts the moderating means in response to input from the sensors. The selection and use of control devices and circuits to adjust one parameter in response to a measured parameter are well understood in the electronic arts and will not be otherwise discussed in detail herein. Exemplary discussions of control circuitry and devices are set forth, for example, in Dorf, *The Electrical Engineering Handbook*, 2d Edition (1997, CRC Press).

As a further detail, FIG. 1 illustrates that in the most preferred embodiments, the attenuators 13 are oriented upwardly from the cavities 12 so that the vessels 16 are vertically oriented during use. This is, of course, the most convenient way to contain liquids in an otherwise open container.

Figure 2:
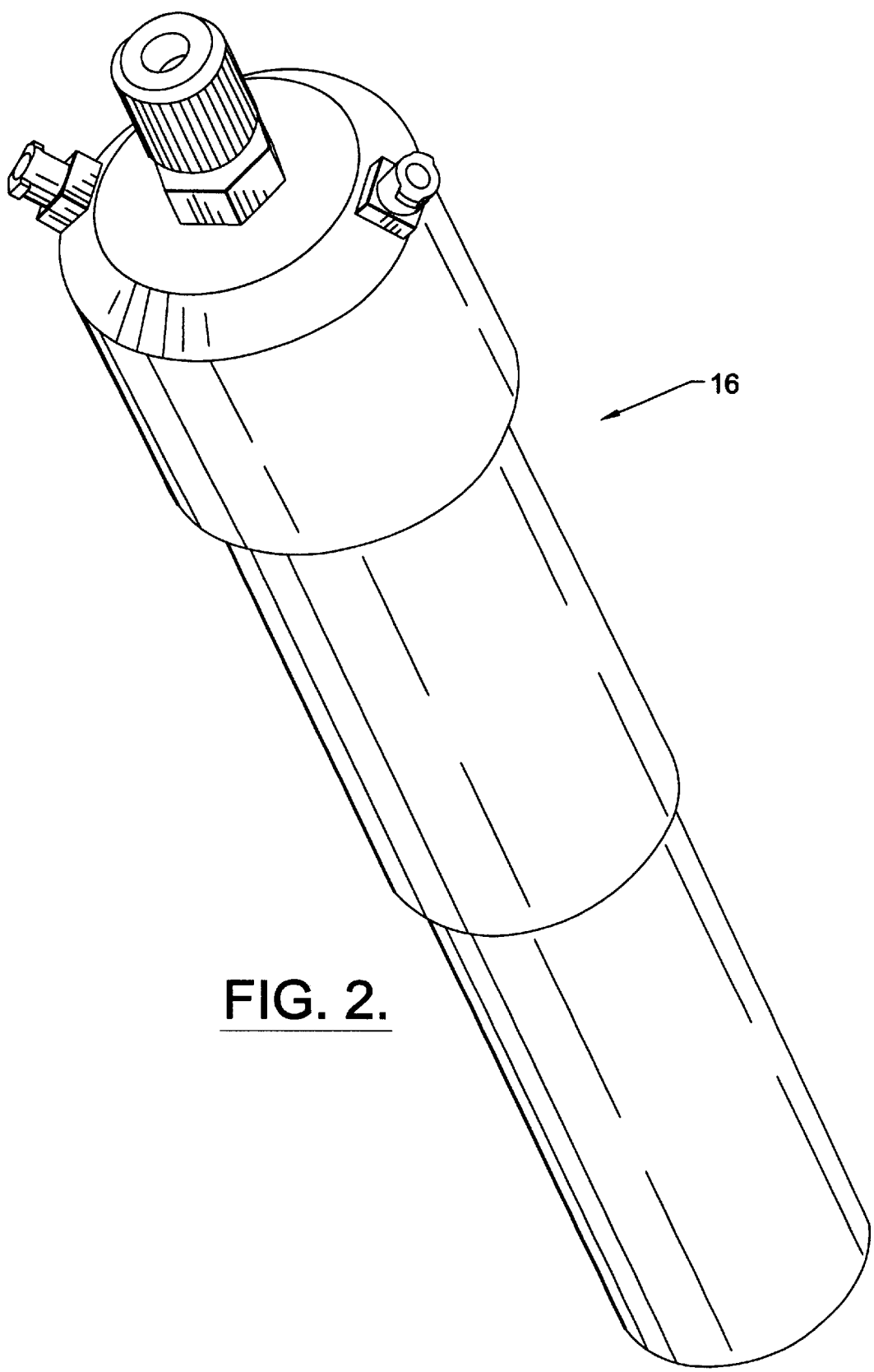
FIG. 2 is a perspective view of a preferred embodiment of a vessel according to the present invention.

FIG. 2 is a perspective view of a vessel again broadly designated at 16 according to the present invention. The vessel comprises a cylinder formed of a microwave transparent material that is resistant to chemical attack. It will be understood that although a cylinder is the most efficient shape for the vessel in many respects, its function could be replicated by other similar or equivalent shapes; for example, a polygon with a plurality of sides that functionally substituted for a cylinder and could complement the shape of a particular cavity and its attenuator.

The cylinder material preferably comprises a polytetrafluoroethylene (PTFE) which is a well understood polymer that can be molded with powder techniques analogous to certain metallurgy processes. PTFE is highly resistant to oxidation and to reaction with chemicals including strong acids. It will be understood, however, that other useful polymers can be used in cylinders according to the present invention to contain less vigorous or less harsh chemicals or chemical reactions.

Figure 3:
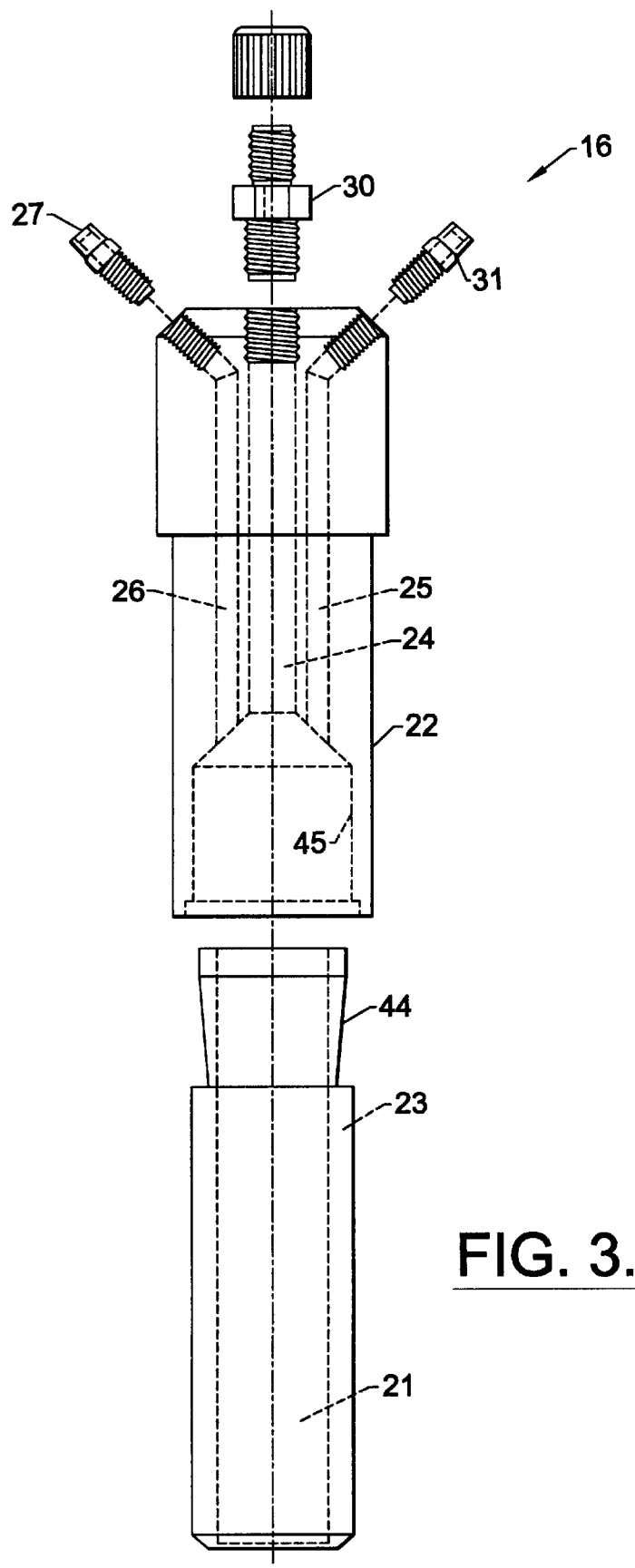
FIG. 3 is an exploded side elevational view of the vessel according to the invention.

FIG. 3 illustrates that the vessel comprises a reaction chamber 21 formed adjacent one end of the cylinder or vessel 16 with the chamber forming substantially less than the total solid volume of the cylinder 16. FIG. 3 further illustrates that the cylinder is formed of two pieces 22 and 23 that are separable at a position that permits chemical compositions to be added to the reaction chamber 21.

The cylinder 16 (and in FIG. 3 the illustrated upper portion or upper piece 22) includes at least one fluid passageway 24 positioned longitudinally in the cylinder and extending from the chamber 21 to the opposite end of the cylinder from the chamber 21 so that fluids can travel between the chamber and the opposite end of the cylinder during microwave assisted chemical processes. In a particularly preferred embodiment, the vessel 16 also includes two additional fluid passageways 25 and 26 which similarly travel from the reaction chamber 21 to the opposite end of the cylinder 16. When three passageways are available, one (e.g., 25) can be used to allow ambient gases including air to enter the reaction chamber while another (e.g., 24) is used to draw hot vapors from the reaction chamber 21 before they can recondense. The third passageway (e.g., 26) can be used to add additional liquid to the reaction while the reaction is in progress and without stopping to open the vessel or cut off the microwave radiation.

In this embodiment, the vessel 16 further includes means, shown as the hose fittings (e.g., threaded adapters 27, 30, and 31) at the end of each of the respective passageways at the opposite end of the cylinder 16 from the reaction chamber 21, for draining fluids—and particularly vapors, through the passageway quickly enough to avoid condensation of hot gases in the passageway. It will be understood that the illustrated threaded fittings are exemplary rather than limiting of this aspect of the invention and that pressed or molded fittings, or some other equivalent arrangement, could be incorporated in their place.

Figure 4:
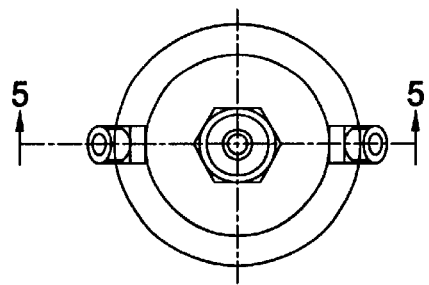
FIG. 4 is a top plan view of the vessel of the invention.
Figure 5:
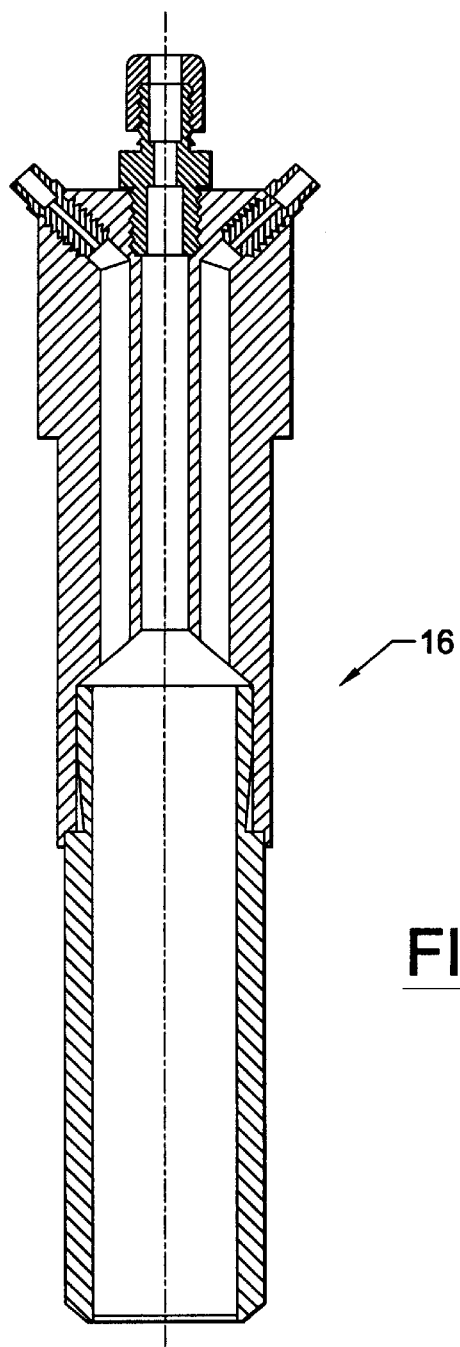
FIG. 5 is a cross-sectional view taken along line 5—5 of FIG. 4.

The top plan and cross-sectional views of FIGS. 4 and 5 illustrate these same structural features with the two parts of the cylinder being joined as they appear in use.

Figure 6:
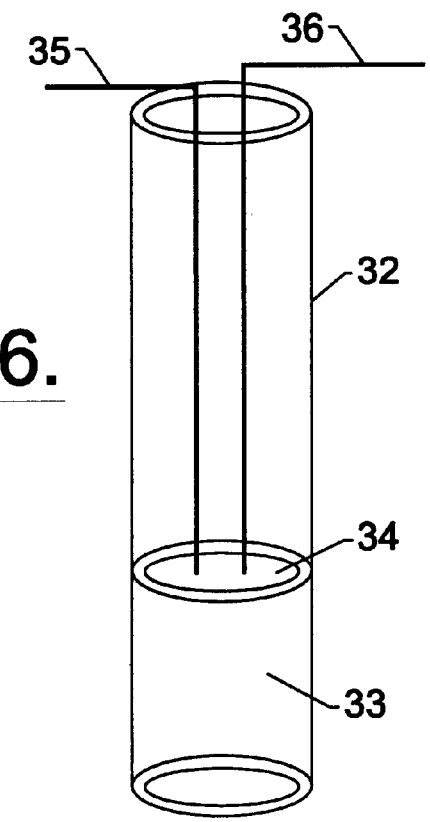
FIG. 6 is a schematic illustration of a second embodiment of the invention.
Figure 7:
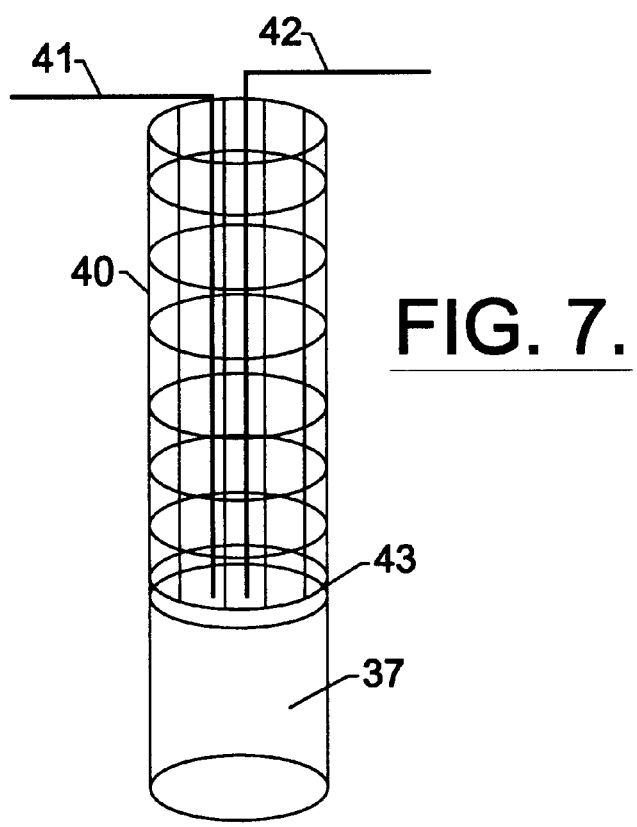
FIG. 7 is a schematic illustration of a third embodiment of the invention.

FIGS. 6 and 7 illustrate other embodiments of the invention. FIG. 6 illustrates a cylinder 32 according to the present invention formed of glass. In this embodiment, the reaction chamber is illustrated at 33 and is separated from the remainder of the cylinder by the lid 34. Two passageways 35 and 36 are illustrated as extending through the upper portion of the cylinder 32 and to the lid 34 so that they communicate with the reaction chamber in the manner described above for adding and removing gases and vapors.

FIG. 7 illustrates a third embodiment of the invention in which the reaction chamber 37 is formed of glass or a polymer as described above, but in which the remainder of the cylinder that supports the passageways comprises a cage or frame 40 that supports passageways in the form of tubing 41 and 42. As in the embodiment illustrated in FIG. 6, a lid 43 defines the volume of the reaction chamber 37 so that the entire cylinder 40 can be placed in the cavity and the attenuator while maintaining just the reaction portion in the cavity.

Described somewhat differently, although using the same reference numerals, the vessel 16 comprises a reaction chamber cylinder 23 formed of a material that is microwave transparent and resistant to chemical attack and includes a male sleeve 44 (which is illustrated as smooth with an inclined shape for locking purposes but which could be threaded or otherwise fastened) extending from the mouth of the reaction chamber 21. A venting cylinder 22 is formed of the same material as the reaction chamber cylinder 23 and includes a female sleeve 45 that fits over the male sleeve 44 of the reaction chamber vessel 21 for engaging the reaction chamber vessel 21 to the venting cylinder or upper portion 22. A plurality of passages 24, 25, 26 extend longitudinally entirely through the venting cylinder 22 for providing fluid access to and from the reaction chamber 21 through the venting cylinder 22 when the reaction chamber cylinder 23 and the venting cylinder 22 are engaged.

As FIG. 3 illustrates and as previously described, one of the passageways 24 is axial with the cylinder 16 and two other of the passageways 25 and 26 are parallel to the axial passageway 24.

It will be understood that the size of the reaction chamber 21 in the vessel 16 will be preferably selected based upon the size of the cavity of the system with which the vessel is to be used, with the functional purpose being to limit the volume of the reaction chamber 21 to that which will be positioned entirely within the cavity when the vessel 16 is placed into the cavity and its attenuator. As a microwave assisted chemical reaction proceeds and particularly one where hot vapors are generated, they can be drawn off through the passageways, preferably 25 or 26, with the other passageway serving as an inlet for flowing gases or ambient air. By carrying off the hot gases in proactive fashion, the undesired recondensation of vapor in the vessel is minimized or entirely eliminated. As a result, in chemical reactions where reduction of the volume of the liquid is of some concern, or even a necessity, the vessel provides a superior structure for making sure that the vapors are removed as desired.

In the drawings and specification, there have been disclosed typical preferred embodiments of the invention, and, although specific terms have been employed, they have been used in a generic and descriptive sense only and not for purposes of limitation, the scope of the invention being set forth in the following claims.

That which is claimed is:

1. A system for carrying out microwave assisted chemistry, comprising:

a source of microwave radiation;

a cavity in communication with said source;

an attenuator in communication with said cavity for providing access to said cavity while preventing microwaves from escaping through said attenuator; and a microwave-transparent, substantially cylindrical vessel vertically and removably positioned in said cavity and said attenuator and extending externally of said attenuator, said vessel capable of holding materials in said cavity while microwaves from said source are applied thereto;

said vessel further comprising a reaction chamber and a venting portion;

said reaction chamber being positioned entirely within said cavity;

said venting portion being positioned adjacent to said reaction chamber, and extending from said cavity, and extending through said attenuator, and extending externally of said attenuator; and said venting portion further comprising a plurality of passageways extending longitudinally from said reaction chamber entirely through said venting portion, said passageways comprising an axial passageway for exhausting vapors and gases from said vessel and a parallel passageway for allowing ambient gases from sources external to said vessel to enter said reaction chamber below said axial passageway to thereby lift the vapors and gases and promote efficient evaporation of liquids.

2. A microwave system according to claim 1 comprising a plurality of said cavities, with each said cavity having an associated attenuator and an associated microwave-transparent vessel.

3. A microwave system according to claim 2 wherein the source of microwave radiation is a single microwave source, and all of said cavities are in communication with said single microwave source.

4. A microwave system according to claim 2 wherein said microwave source comprises a magnetron.

5. A microwave system according to claim 3 and further comprising individually adjustable microwave moderating means between each said cavity and said single microwave source for adjusting the microwave radiation that reaches each said cavity from said single microwave source.

6. A microwave system according to claim 5 and further comprising a sensor associated with each said vessel for monitoring the conditions of said vessel and the reaction therein.

7. A microwave system according to claim 6 wherein said sensors are selected from the group consisting of temperature sensors, pressure sensors, photodetectors and electrochemical detectors.

8. A microwave system according to claim 6 and further comprising a control system operatively associated with said moderating means and said sensors for adjusting said moderating means in response to said sensors.

9. A microwave system according to claim 1 wherein said attenuator extends vertically upwardly from said cavity and said vessel is vertically oriented in said attenuator and said cavity.

10. A microwave system according to claim 1 wherein said vessel comprises:

a cylinder formed of a microwave-transparent material that is resistant to chemical attack;

said reaction chamber formed adjacent one end of said cylinder, said chamber forming less than the total solid volume of said cylinder; and means for drawing fluids through at least one passageway quickly enough to avoid condensation of hot vapors in the cylinder.

11. A system for carrying out microwave assisted chemistry, comprising:

a source of microwave radiation;

a cavity in communication with said source;

an attenuator in communication with said cavity, said attenuator providing access to said cavity while preventing microwaves from escaping from said attenuator;

a cylindrical vessel or cylinder formed of a microwave-transparent material that is resistant to chemical attack, said cylinder vertically and removably positioned in said cavity and said attenuator, and extending externally of said attenuator;

a reaction chamber formed adjacent one end of said cylinder and being positioned within said cavity, said chamber forming less than the total solid volume of said cylinder;

a plurality of fluid passageways positioned longitudinally in said cylinder and extending from said chamber to the opposite end of said cylinder from said chamber, said passageways comprising an axial passageway for exhausting vapors and gases from said cylinder and a parallel passageway for allowing ambient gases from sources external to said cylinder to enter said reaction chamber below said axial passageway to thereby lift the vapors and gases and promote efficient evaporation of liquids during microwave assisted chemical processes; and means for drawing vapors and gases through said axial passageway quickly enough to avoid condensation of hot vapors and gases in the cylinder.

12. A microwave system according to claim 11 wherein said cylinder comprises two pieces that are separable at a position that permits chemical compositions to be added to said reaction chamber.

13. A microwave system according to claim 11 wherein said cylinder is formed of a tetrafluoroethylene (PTFE) polymer.

14. A microwave system according to claim 11 wherein said cylinder is formed of glass.

15. A microwave system according to claim 11, wherein the plurality of fluid passageways further comprises an additional passageway parallel to said axial passageway.

16. A microwave system according to claim 15 wherein said fluid drawing means comprise threaded tubing adapters at the end of each said passageway at the opposite end of said cylinder.

17. A microwave system according to claim 11 wherein the portion of said cylinder other than said reaction chamber comprises a cylindrical frame and said fluid passageways comprise a plurality of tubes supported on said frame.

18. A system for carrying out microwave assisted chemistry, comprising:

a source of microwave radiation;

a cavity in communication with said source;

a reaction chamber cylinder formed of a material that is microwave transparent and resistant to chemical attack, said reaction chamber vertically and removably positioned within said cavity and having a closed end and a mouth, and including a male sleeve extending from said mouth of said reaction chamber cylinder;

a venting cylinder formed of the same material as said reaction chamber cylinder and including a female sleeve that fits over said male sleeve of said reaction chamber cylinder for engaging said reaction chamber cylinder to said venting cylinder; and a plurality of passageways extending longitudinally entirely through said venting cylinder, said passageways comprising an axial passageway for exhausting vapors and gases from said reaction chamber cylinder and a parallel passageway for allowing ambient gases from sources external to said reaction chamber cylinder and said venting cylinder to enter said reaction chamber cylinder below said axial passageway to thereby lift the vapors and gases and promote efficient evaporation of liquids when said reaction chamber cylinder and said venting cylinder are engaged.

19. A microwave system according to claim 18, wherein said plurality of passageways further comprises an additional passageway parallel to said axial passageway.

20. A microwave system according to claim 18 further comprising hose fittings at the terminal ends of said passageways.

21. A microwave system according to claim 18, wherein said cylinders are formed of a tetrafluoroethylene polymer.

\* \* \* \* \*